United States Patent [19]

Valentini

[11] Patent Number: 4,754,644
[45] Date of Patent: Jul. 5, 1988

[54] VARIABLE-RELUCTANCE ACCELEROMETER

[75] Inventor: Mario Valentini, Turin, Italy

[73] Assignee: Illinois Tool Works, Inc., Chicago, Ill.

[21] Appl. No.: 20,966

[22] Filed: Mar. 3, 1987

[30] Foreign Application Priority Data

Mar. 4, 1986 [IT] Italy ................. 67171 A/86

[51] Int. Cl.$^4$ ............................. G01P 15/11
[52] U.S. Cl. ................... 73/517 R; 73/499; 73/654
[58] Field of Search ............... 73/517 R, 499, 654; 340/669; 307/121

[56] References Cited

U.S. PATENT DOCUMENTS 2,852,243  9/1958  Shepard ............... 73/517 R
3,100,292  8/1963  Warner et al. ......... 73/517 R
3,129,347  4/1964  Tognola ............... 73/517 R
3,483,759  12/1969 Venetos et al. ........ 73/517 R
3,987,392  10/1976 Kugelmann et al. ..... 73/499
4,446,741  5/1984  Sirokorad et al. ...... 73/654

Primary Examiner—John Chapman
Attorney, Agent, or Firm—John P. O'Brien; T. W. Buckman

[57] ABSTRACT

An accelerometer comprising a permanent magnet which, when idle, is maintained dynamically balanced by virtue of magnetic fields acting on opposite sides in relation to its poles, and which is designed to travel along a respective guide. The accelerometer has a coil arranged coaxially in relation to the traveling direction of the magnet, and is designed to generate an electric signal, the intensity of which depends on the relative acceleration of the coil in relation to the magnet and in the traveling direction of the same.

4 Claims, 2 Drawing Sheets

VARIABLE-RELUCTANCE ACCELEROMETER

BACKGROUND OF THE INVENTION

The present invention relates to a variable-reluctance accelerometer, in particular, though not exclusively, for measuring vertical acceleration of a point on a moving system, e.g. a vehicle.

Numerous types of accelerometers are currently available on the market. In particular, vertical acceleration is known to be measured using a body of a given weight resting on a flexible horizontal blade firmly connected to another body the acceleration of which is to be measured. Should the blade and the body resting on it be both stationary or moving uniformly, the force exerted by the body on the blade is no more than the weight of the body itself. If, on the other hand, both move vertically in varying manner, the blade is also subjected to the force deriving from the mass of the body multiplied by its acceleration, and is therefore deformed. Acceleration may be evaluated by measuring certain effects deriving from deformation of the blade: for example, if the latter consists of a microphone diaphragm, deformation results in a variation of microphone current, which is easily measurable.

Though sufficiently prompt-acting, i.e. capable of giving an accurate indication of even rapidly varying acceleration, a measuring method of the aforementioned type presents a number of drawbacks, one of which is undoubtedly the generation of so-called spurious signals, even in the presence of zero acceleration.

Other types of accelerometers are also known, but these fail to provide fully for the rapid response, reliability and linearity required for specific applications, such as the control of actuators (e.g. suspension regulating devices) used on motor vehicles.

SUMMARY OF THE INVENTION

The aim of the present invention is to provide an accelerometer designed to overcome the aforementioned drawbacks typical of known accelerometers.

With this aim in view, according to the present invention, there is provided an accelerometer, characterised by the fact that it comprises:

a main permanent magnet;

a guide housing the said main magnet and enabling it to travel in a given prearranged direction;

first and second magnetic field generating means wherein the respective north and south poles are arranged facing identical north and south poles on the said magnet, the said first and second magnetic field generating means exerting, on the said main magnet, respective repelling forces which, when idle, maintain the said main magnet dynamically balanced inside the said guide;

a coil located between the said first and second magnetic field generating means and coaxial in relation to the traveling direction of the said main magnet, the said coil being designed to generate an electric signal (induced electromotive force) the intensity of which depends on the relative acceleration of the said coil in relation to the said main magnet and in the said traveling direction.

BRIEF DESCRIPTION OF THE DRAWINGS

A preferred embodiment of the present invention will be described by way of a non-limiting example, with reference to the accompanying drawings, in which.

DETAILED DESCRIPTION OF THE INVENTION

Figure 1:
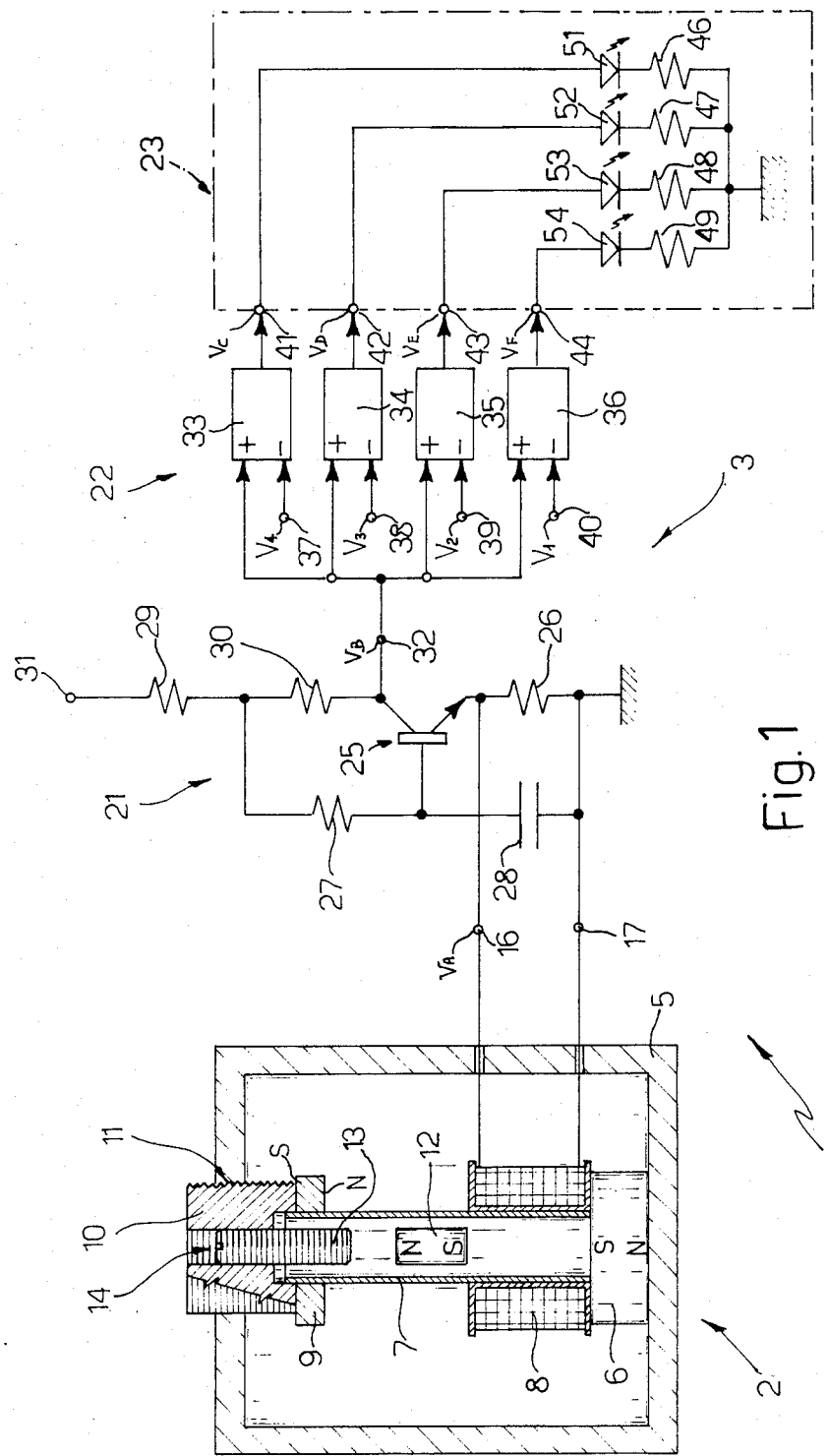
FIG. 1 shows a schematic view of an accelerometer according to the teachings of the present invention and substantially divided into a detecting section and an electronic processing section.

Number 1 in FIG. 1 indicates an accelerometer having a sensor 2, designed to generate an electric signal proportional to the vertical acceleration it is itself subjected to, and an electronic processing circuit 3 substantially designed to amplify the signal generated by sensor 2 and to supply an optical indication depending on the amount of vertical acceleration detected from the said sensor 2. In more detail, sensor 2 presents a casing 5 shown schematically in FIG. 1 and designed to be secured mechanically (in a manner not shown) to an object the acceleration of which is to be measured. The said casing 5 houses the following components:

a permanent magnet 6 conveniently presenting a cylindrical structure;

a tubular guide 7 a bottom end portion of which rests on the surface of magnet 6;

a coil 8 wound externally about the bottom portion of guide 7;

a toroidal magnet 9 supported on the top end of guide 7 by means of an externally-threaded tubular body 10 engaging a threaded hole 11 formed in the top wall of casing 5;

a permanent magnet 12 housed inside guide 7 and designed to travel along the same between a bottom position, defined by the surface of permanent magnet 6, and a top position defined by a threaded pin 13 screwed into a threaded axial hole 14 on the said tubular body 10.

The opposite terminals of coil 8 are connected to respective terminals 16 and 17, which also constitute the input terminals of processing circuit 3, which comprises an amplifying section 21, a comparing section 22, and a signaling section 23. Amplifying section 21 substantially consists of a transistor 25, the emitter of which is connected to both terminal 16 and the first terminal of a resistor 26, the second terminal of which is grounded. The base of transistor 25 is connected to both the first terminal of resistor 27 and the first terminal of condenser 28, the second terminal of which is both grounded and connected to terminal 17. The second terminal of resistor 27 is connected to the intersection of the first terminals of resistors 29 and 30. Resistor 29 has a second terminal connected to a terminal 31 conveniently connected, in a manner not shown, to the positive pole of a continuous supply source having its negative pole grounded. The second terminal of resistor 30 is connected to both the collector of transistor 25 and terminal 32, which constitutes the input terminal of comparing section 22.

Comparing section 22 substantially comprises four threshold comparator circuits, 33, 34, 35, 36, each of which has a non-inverting input (+) connected to terminal 32, and an inverting input (−) connected respectively to terminals 37, 38, 39, 40, which are supplied with respectively decreasing reference voltages. Each comparator 33, 34, 35, 36 has an output connected to a respective terminal 41, 42, 43, 44 constituting a respective input of signaling section 23.

Section 23 comprises four signaling branches comprising respective resistors 46, 47, 48, 49 series-connected to respective light-emitting diodes 51, 52, 53, 54. The said resistors present a common grounded terminal, whereas the respective cathodes of diodes 51, 52, 53, 54 are connected to respective terminals 41, 42, 43, 44.

Figure 2:
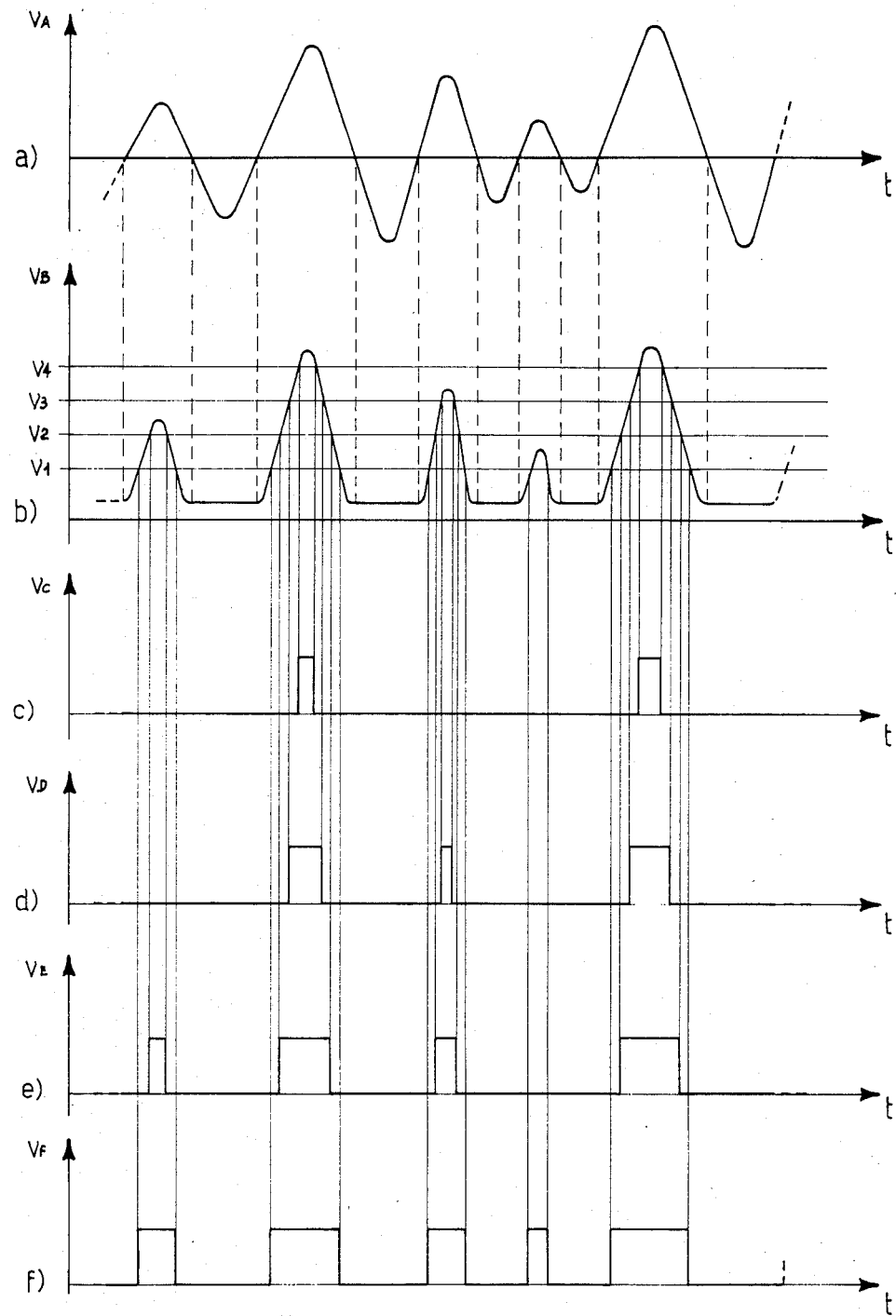
FIG. 2 shows a number of graphs of given electric signals detected at given points on the electronic section shown in FIG. 1.

FIG. 2 shows graphs, as a function of time t, of a number of electric signals $V_A$, $V_B$, $V_C$, $V_D$, $V_E$, $V_F$ picked up at respective points on the FIG. 1 processing circuit. $V_1$, $V_2$, $V_3$ and $V_4$ also indicate the corresponding amplitude of the reference signals present at terminals 37, 38, 39, 40 of threshold comparators 33, 34, 35, 36.

Operation of accelerometer 1 is as follows. First of all, magnets 6, 12 and 9 are arranged with their respective north and south poles facing each other, so that the respective magnetic fields generated by mangets 6 and 9 repel magnet 12 upwards and downwards respectively. In the event of zero acceleration of casing 5 in the traveling direction of magnet 12, the said magnet 12 is maintained, by virtue of the said repelling forces, dynamically balanced between magnets 6 and 9 inside tubular guide 7. Should casing 5, on the other hand, be acclerated parallel with the axis of guide 7, this is accompanied by relative travel of magnet 12 along guide 7 and, more particularly, in relation to coil 8. This, in turn, results in a variation of the magnetic flow linking coil 8, which variation is proportional to the said acceleration of casing 5. The said variation in magnetic flow, which also affects magnetic reluctance, causes coil 8 to generate an electromotive force and, consequently, an electric signal ($V_A$ in FIG. 2a) the intensity of which is obviously proportional, as already stated, to the said acceleration of casing 5.

Operation of processing circuit 3 is substantially as follows. In idle operation mode, signal $V_A$ is absent and transistor 25 is kept conducting by virtue of resistor 27 and condenser 28, which positively polarize the base-emitter connection of transistor 25, the output signal $V_B$ of which is therefore low. As a result, the output signals from all of comparators 33, 34, 35, 36 are also low, and all of light-emitting diodes 51, 52, 53, 54 remain off.

In the presence of acceleration, i.e. of signal $V_A$ at the input of amplifying section 21 of processing circuit 3, section 21 amplifies all the positive peaks of signal $V_A$ to give, at terminal 32, a signal $V_B$ the graph of which is shown in FIG. 2b. Comparators 33, 34, 35, 36 compare signal $V_B$ with respective reference signals $V_1$, $V_2$, $V_3$, $V_4$, and generate respective electric output signals $V_C$, $V_D$, $V_E$, $V_F$. The said output signals are high when input signal $V_B$ exceeds the respective reference signal $V_4$, $V_3$, $V_2$, $V_1$, which obviously activates the respective light-emitting diode 51, 52, 53, 54.

With reference to the structure of sensor 2, it should be noted that the intensity with which magnet 12 is repelled by magnet 9 may be regulated by shifting magnet 9 along guide 7 by torquing tubular body 10. In other words, this provides for regulating the sensitivity of sensor 2. Furthermore, to prevent magnet 12, as it slides vertically, from exceeding a critical point of the repelling force exerted by magnet 9 and so being attracted to the same, threaded pin 13 is appropriately torqued so that its end portion occupies the top end portion of guide 7, thus preventing vertical overtravel of magnet 12.

Another point to note is that, by virtue of the circuit configuration of amplifying section 21 of circuit 3, the terminals of resistor 26 are constantly supplied with continuous voltage determining a continuous flow of current in coil 8. In other words, coil 8 also generates a magnetic field, the force lines of which, inside guide 7, are substantially parallel with the axis of the said guide, thus determining a concentration of the flow lines also affecting magnet 12, which is therefore positioned axially in such a manner as to prevent sliding on the inner surface of guide 7.

The advantages of accelerometer 1 according to the present invention will be clear from the foregoing description. Firstly, sensor 2 is especially sensitive, prompt-acting, and capable of generating an electric signal practically free from any interference. Secondly, by virtue of of being based on a non-mechanical operating principle, sensor 2 is also free from imprecision caused by wear on mutually-operating mechanical parts, as currently occurs on the known types of accelerometers already mentioned.

The signal processed by circuit 3, and proportional to acceleration, gives a precise indication of acceleration via signaling section 23. The said signal could also be employed in other ways. For example, in the case of motor vehicles, the output signals generated by comparing section 22 could be employed, via appropriate actuators, for regulating the vehicle suspension as a function of the amount of vertical acceleration detected.

To those skilled in the art it will be clear that changes may be made to accelerometer 1 as described and illustrated herein without departing from the scope of the present invention. For example, permanent magnets 6 and 9 could be replaced by coils supplied with d.c. current, for generating magnetic fields equivalent in all respects to those generated by magnets 6 and 9. Furthermore, magnet 12 may be held stationary, and magnets 6 and 9 allowed to slide longitudinally together with coil 8.

I claim:

1. An accelerometer comprising a main permanent magnet, a guide housing said main magnet and enabling it to travel in a given prearranged direction, first and second magnetic field generating means wherein the respective north and south poles are arranged facing identical north and south poles on said main magnet, said first and second magnetic field generating means exerting respective repelling forces on the said main magnet which, when idle, maintain the said main magnet dynamically balanced inside said guide, a coil located between said first and second magnetic field generating means and coaxial in relation to said main magnet and in said traveling direction, an input signal means or providing a constant supply current to said coil including a common base connected transistor having a resistor-capacitor network connected in series across its emitter-base terminal and said coil connected in parallel with the resistor of said resistor-capacitor network, and signal comparator means for comparing the output signal generated by said coil.

2. An accelerometer as defined in claim 1, wherein said signal comparator means comprises several threshold comparators, each having a comparing input connected to a respective reference voltage.

3. An accelerometer as defined in claim 2 further comprising a number of optical signaling means, each connected to the output of one of said threshold comparators.

4. An accelerometer as defined in claim 3, wherein each of said optical signaling means comprises a light-emitting diode.

* * * * *